United States Patent Office

3,256,444
Patented June 14, 1966

3,256,444
TIME RATIO SPECTROPHOTOMETERS
Owen Charles Jones, Teddington, Middlesex, and Frank Joseph John Clarke, Twickenham, Middlesex, England, assignors to National Research Development Corporation, London, England, a corporation of Great Britain
Filed Sept. 4, 1962, Ser. No. 221,040
Claims priority, application Great Britain, Sept. 7, 1961, 32,232/61
11 Claims. (Cl. 250—232)

The invention relates to apparatus for the attenuation of radiation which can be used in any instrument where radition intensities have to be measured and compared, for example in the spectrophotometers used to determine the transmission of optical filters. For convenience apparatus in accordance with the invention will be referred to throughout this specification as photometric apparatus, although its usefulness is not confined to visible radiation.

In a number of instruments, such as spectrophotometers, it is required to attenuate a bean of radiation to an extent which can be accurately determined. The devices usually adopted for this attenuation reduce the intensity of the radiation by reducing its amplitude by a measurable factor. For this purpose it is usual to employ either a comb attenuator, consisting of comblike screens having tapering teeth which can be made to intrude into a light beam to a variable extent; an optical wedge, consisting of a transparent body having a graded optical density; or a polarising attenuator. Although the use of such attenuators makes it possible to use a null detection method for the measurement of radiation intensity, which is generally preferable to the use of a linear radiation detector and amplifier system, accuracy better than say $\pm 1/10^3$ of full scale reading is not attained in commercially available instruments.

In photometric apparatus in accordance with the invention the average intensity of the radiation is reduced without affecting its amplitude. This is achieved by means of a repetitive shutter of which the repetition rate may be varied and of which the open time to shut time ratio can be adjusted over a substantial range, so as to reduce the average intensity (mean flux) to a value which can be equated, at a flux averaging null detector, to that of a radiation to be measured, and to an extent which is determined by comparison of the open and shut times of the shutter. The only quantity to be measured accurately is time.

The open and shut times of the shutter can most conveniently be compared by directing part of the radiation from it onto a supplementary detector, for example, a photomultiplier, the output from which operates an electronic switching and timing arrangement. In one arrangement the incidence or cessation of radiation on a photomultiplier is used to operate an electronic or other switch between the output of a standard source of high frequency electrical pulses and a counter. The pulse source must be highly stable over short periods but long term stability, with concomitant expense, is not essential.

If the shutter transmission characteristic is to be varied over a usefully wide range by varying the open to shut time ratio, the minimum open time to be provided for should be small by comparison with the repetition time. For good accuracy over the whole range, the time taken in opening and closing should be short compared with the minimum open time. The open to shut time ratio of a repetitively running shutter can of course be varied by altering the open time or closed time or both, depending on the particular application.

One convenient kind of shutter of which the transmission can be varied is one which delivers light pulses of fixed length, said ½ millisecond, and whose repetition rate can be varied, say from 1 c.p.s. to 1,000 c.p.s. The exact open to shut time ratio of such a shutter can readily be measured by the switching method mentioned above using an oscillator of fixed frequency, say 1 mc./s. to provide the high frequency electrical pulses. An alternative method is to modulate the light reaching the shutter by any convenient fixed-frequency method operating at, say, 1 mc./s. The shutter transmission may then be measured by counting the number of light pulses at this higher frequency which are passed by the shutter in unit time. It is clear that if this type of shutter delivers very short (fixed duration) pulses, say of 1 $\mu$sec. duration, this last method will not be practicable owing to the required frequency of modulation and counting then being very high, say 1,000 mc./s., and presenting serious technical difficulties. However, if only relative values of the transmission are to be determined accurately, these can be taken as equal to the ratio of corresponding repetition frequencies, provided that the nominal pulse length of, say, 1 $\mu$sec. can be kept sufficiently constant.

In a double beam instrument the relative times during which the respective beams are directed onto a null detector can be determined by the same arrangement as that used to measure the shutter characteristic.

The shutter might for example, be mechanical, electro-mechanical, electro-optic, or magneto-optic.

A mechanical shutter may comprise a variable sector disc chopping a very narrow slit image.

An electro-mechanical shutter may comprise a mirror arranged to be tilted by the vibration of a piezo-electric crystal. The mirror may be formed as an integral part of the crystal if the mode of vibration is suitable.

A Kerr cell or a stressed glass plate may be used as an electro-optic shutter.

Neither long term retention of shutter characteristics nor absolute constancy in operation are essential in view of the time measuring technique employed.

Any detector used for comparing the radiation emerging from the shutter with another beam of radiation must obey Talbot's law closely, that is to say it must average a pulsed flux accurately with respect to time, but being used as a null detector, it need not necessarily exhibit D.C. linearity. A vacuum photocell can be shown to fulfill this condition so long as the pulse repetition rate is high enough, say above 1 c.p.s. Photomultipliers may also be used for null detection; it is then possible to dispense with the supplementary detector used for counting, as the one detector could perform both tasks simultaneously.

In order that the invention may be thoroughly understood three double-beam spectrophotometers in accordance with it will be described in some detail, by way of example, with reference to the accompanying drawings in which.

Each of the spectrophotometers illustrated in the accompanying drawings uses the invention for measuring attenuation, in a different way.

Figure 1:
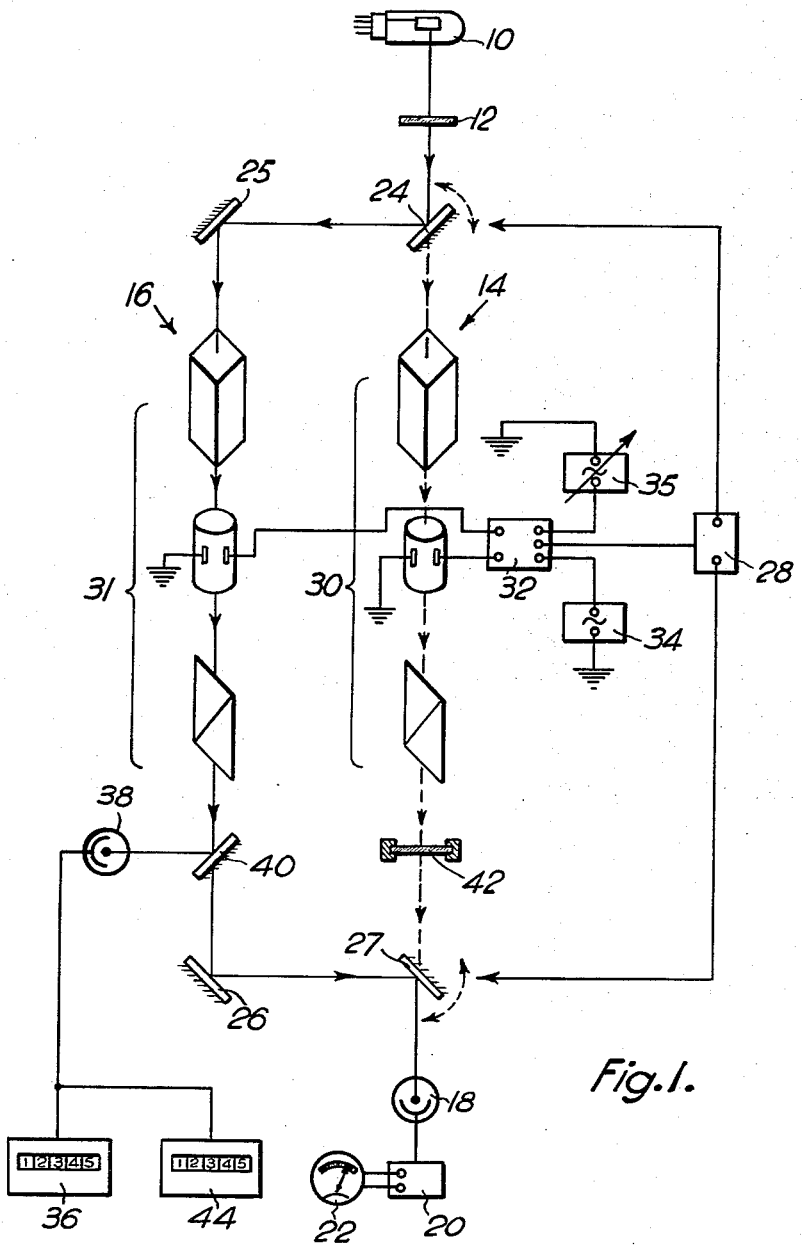
FIGURE 1 is a diagram of a spectrophotometer employing two high frequency shutters, shown for the sake of illustration as magneto-optic shutters using Kerr-cells.

The first instrument, shown in FIGURE 1, consists of a steady light source 10 and a monochromator 12, which illuminates one of two optical channels 14 and 16 alternately at say, 13 c.p.s., the radiation transmitted by either channel being incident on a null detector 18 obeying Talbot's law, such as a photo-emissive cell. The output from the photometric null detector 18 is passed through a phase-sensitive narrow-band amplifier 20 tuned to 13 c.p.s., and to an indicator 22 which displays the degree of off-balance. The radiation is made to illuminate the two channels 14 and 16 alternately by means of mirrors 24, 25, 26 and 27, the mirrors 24 and 27 being oscillated synchronously under the control of a switching device 28, so as to provide the necessary changeover of power between the channels 14 and 16.

There are two shutters, 30, 31, one in each channel, and each controlled by one of two triggering circuits 34 and 35 respectively, and a gating circuit 32. The gating circuit 32 allows the two shutters to operate alternately for a fixed interval of, say, 1/40 sec. in each half cycle. In the test beam 14 the shutter 30 opens to deliver light pulses of fixed amplitude and duration (of say $10^{-7}$ sec.), and at some fixed recurrence frequency of, say 1 mc./s. determined by triggering from a stable oscillator 34. In the reference beam 16 is a shutter 31 which transmits light pulses of fixed amplitude and duration, similar to the pulses delivered in the test beam 14. The reference shutter 31, however, is triggered by a variable oscillator 35 whose working range is, say, from over 1 mc./s. down to 100 c.p.s.

With no specimen filter present, the pulse recurrence frequency in the reference beam 16 is adjusted until a photometric balance is obtained for the two beams, and the number of reference beam light pulses in an integral number of 13 c.p.s. chops is recorded on a high-speed counter 36. This is achieved by reflecting a small fraction of the light in the reference beam on to a supplementary detector 38 by means of an optical beam-splitter 40, and allowing the counter 36 to receive electrical pulses from this supplementary detector corresponding to the light pulses in the reference beam. The specimen filter 42 is now inserted in the test beam 14, and reduces the amplitude of the 25,000 or so light pulses passed during the 1/40 sec. gating time in each of an integral number of 13 c.p.s. chops. The frequency of the un-attenuated light pulses in the reference beam 16 is now reduced to compensate until a photometric null balance is again obtained. The number of reference beam light pulses in the same integral number of 14 c.p.s. chops is recorded on a second high-speed counter 44. The ratio of the counts recorded on the two counters then gives the transmission factor of the specimen filter 42 directly.

Figure 2:
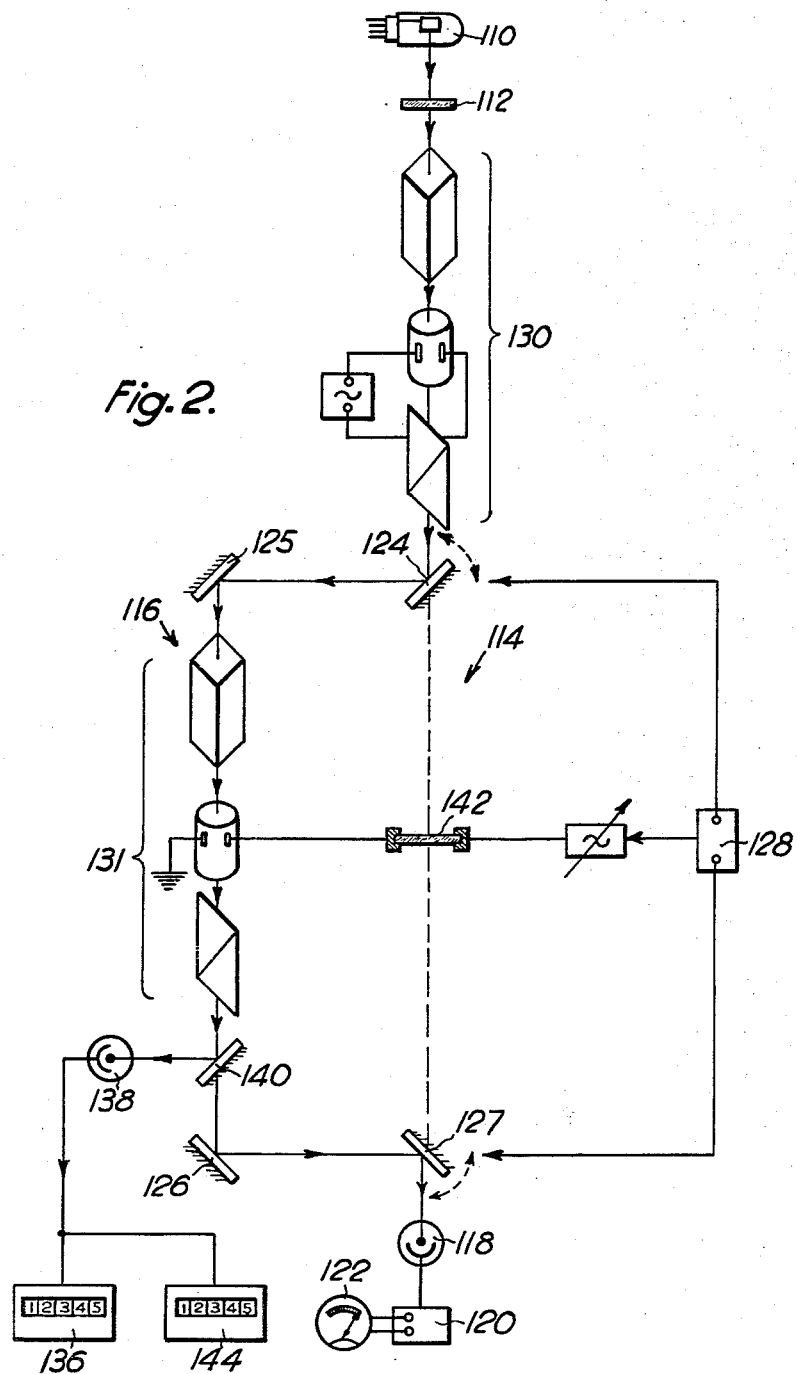
FIGURE 2 is a similar diagram of a spectrophotometer employing one high frequency shutter and one low frequency shutter, again shown as Kerr-cells.

The second instrument, shown in FIGURE 2, consists of a steady light source 110, monochromator 112, two channel optical system, 114, 116, including four mirrors 124, 125, 126 and 127, common photometric detector 118 and phase-sensitive narrow-band detecting circuit 120, 122, as before the frequency of alternation between the two-channels 114 and 116 being again say, 13 c.p.s. In this case there is a high frequency repetitive shutter 130 in the common part of the optical system between the source 110 and two-channel system 114, 116, which modulates the light at a constant frequency of 1 mc./s. In the reference beam 116 is a low frequency variable shutter 131 synchronized with the 13 c.p.s. beam switching device 128, which controls the duration of the reference beam illumination. With no specimen filter present a photometric null balance is achieved by varying the "open" period of the shutter in the reference beam, 116. With a fairly symmetrical optical system the "open" phase for the reference beam 116 will be approximately equal to the fixed time of, say 1/40 sec. during which the test beam 114 is illuminated. The number of high frequency pulsations occurring in an integral number, N, of low frequency chops of the reference beam 116 is recorded on a high speed counter 136, a supplementary detector 138 and beam-splitter 140 in the reference beam 116 being used as in the first example above. When the specimen filter 142 is introduced into the test beam 114, the "open" period of the shutter 131 in the reference channel 116 is varied so as to reduce the duration of the illumination in the reference phase of the 13 c.p.s. sequence. When a fresh null balance is achieved, the number of pulsations occurring in the same integral number, N, of chops of the reference beam 116 is recorded on a second high-speed counter 144. The ratio of the counts recorded on the two counters 136 and 144 enables the transmission factor of the filter 142 to be calculated.

Figure 3:
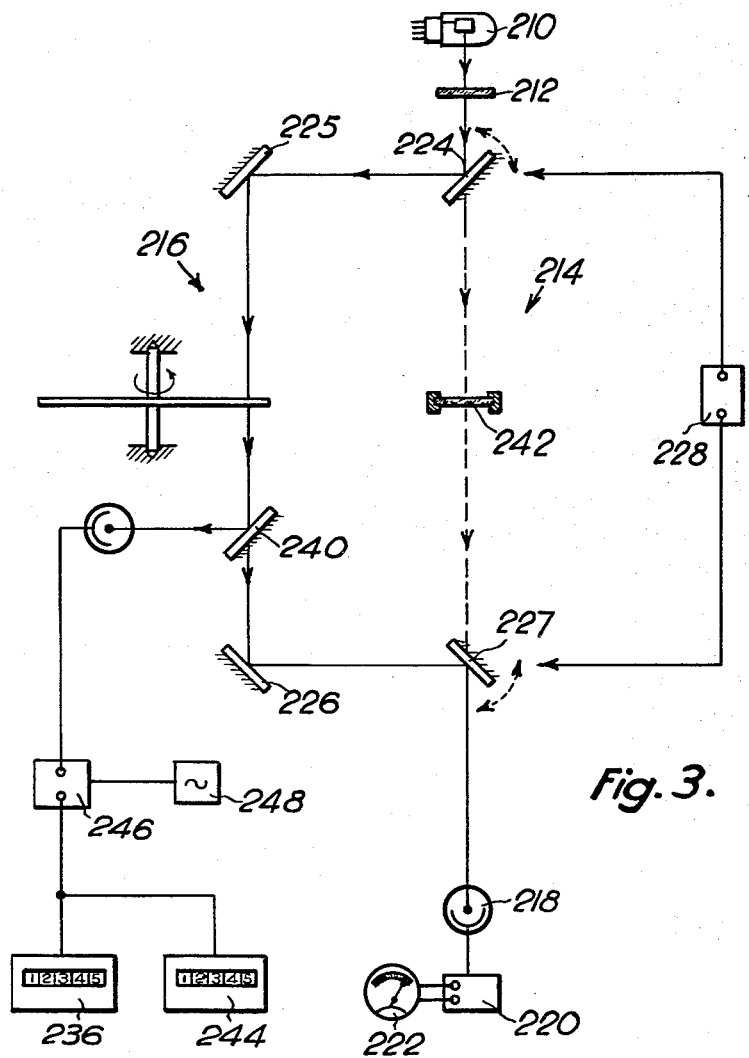
FIGURE 3 is a similar diagram of a third spectrophotometer having one shutter of intermediate frequency, the shutter illustrated being of the mechanical variable sector disc type.

The third instrument, shown in FIGURE 3, consists of a steady light source 210, monochromator 212, two channel optical system 214, 216, including four mirrors 224, 225, 226 and 227, common photometric detector 218 and phase-sensitive narrow-band detecting circuit 220 as above. The low-frequency beam-switching system comprising the switching device 228 and the two mirrors 224 and 227, allows the test and reference beams 214 and 216 respectively to be illuminated alternately for fixed intervals of, say, 1/40 sec. each in a repetitive cycle of frequency of, say, 13 c.p.s. The reference beam contains a shutter 231 of intermediate frequency, 500 c.p.s. whose open-to-shut time ratio $r$ can be varied, as, for example, a variable sector disc. The transmission factor $\mu$ of such a shutter for a photo-detector 218 obeying Talbot's law is given by $$\mu = \frac{r}{1+r}$$

A supplementary detector, 238, receiving light from a beam-splitter 240 in the reference beam 216 as before, can activate an electronic gating circuit 246 so that pulses from a stable high-frequency oscillator 248 can be passed to one of two high-speed counters 236 and 244 only when the detector 238 is illuminated during the reference phase of the 13 c.p.s. sequence. With no specimen filter present, a null balance is achieved by varying the quantity $r$ of the intermediate frequency shutter 231, the transmission factor then being nearly maximum. The total number of oscillator pulses recorded in an integral number of 13 c.p.s. chops is indicated on the counter 236. The specimen filter 242 is then inserted into the test beam 214, and the quantity $r$ of the variable shutter 231 is reduced until a fresh null balance is obtained. The number of pulses occurring in the same integral number of 13 c.p.s. chops is recorded on the second counter 244. The ratio of the numbers of pulses recorded on the two counters 236 and 244 then gives the transmission factor of the specimen filter 242 directly.

We claim:

1. Photometric apparatus comprising means for directing a first beam of radiation and a second beam of radiation the second of which the intensity is to be determined, onto a photosensitive flux averaging null detector, an attenuator for reducing the average intensity of the radiation in the said first beam to a value equal to that to be determined, said attenuator comprising a repetitive shutter of which the open time to shut time can be adjusted over a substantial range so as to reduce the average intensity of the first beam, and means for determining the extent of reduction of average intensity by measuring the on to off time ratio of the first beam.

2. Photometric apparatus comprising means for directing a first beam of radiation and a second beam of radiation, the second of which the intensity is to be determined, onto a photosensitive flux averaging null detector, an attenuator for reducing the average intensity of the radiation in said first beam to a value equal to that to be determined, said attenuator comprising a repetitive shutter of which the open time to shut time can be adjusted over a substantial range so as to reduce the average intensity of the first beam, a supplementary detector, means for directing part of the radiation from said shutter onto said supplementary detector, and an electronic switching and timing means operable by the output from said supplementary detector for measuring the on to off time ratio of the first beam.

3. Photometric apparatus according to claim 2, in which said electronic switching and timing arrangement comprises a standard source of high frequency electrical pulses, a counter and a switch between the output of said source and said counter and arranged to be operated by the incidence and cessation of radiation on said supplementary detector.

4. Photometric apparatus comprising means for directing a first beam of radiation and a second beam of radiation, the second of which the intensity is to be measured, onto a photosensitive flux averaging null detector, an attenuator for reducing the average intensity of the radiation in said first beam to a value equal to that to be determined, said attenuator comprising a repetitive shutter adapted to deliver light pulses of fixed length and whose repetition rate can be varied so as to reduce the average intensity of the first beam, and means for determining the open time to shut time ratio of the shutter.

5. Photometric apparatus according to claim 4, in which the radiation reaching said shutter is modulated at a fixed pulse frequency substantially higher than the highest repetition rate of the said shutter, and in which said means for determining the open time to shut time ratio of said shutter comprises a supplementary detector, means for directing part of the radiation from said shutter onto said supplementary detector and an electronic counter arranged to count the radiation pulses passed by said shutter in unit time.

6. Photometric apparatus according to claim 5, in which said shutter comprises a Kerr cell used as an electro-optic shutter.

7. Photometric apparatus according to claim 5 in which the said modulation is effected by a Kerr cell used as an electro-optic shutter.

8. A double beam a spectrophotometer comprising a steady light source; a photosensitive null detector obeying Talbot's law; a system of mirrors and means for oscillating two of said mirrors synchronously, so as to make radiation from said light source illuminate a first, test, and a second, reference optical channel alternately at a relatively low frequency and to direct radiation transmitted by either of said channels onto said photosensitive null detector; a phase-sensitive narrow-band amplifier tuned to the frequency of oscillation of said two mirrors and connected to receive the output of said photosensitive null detector; an indicator connected to said amplifier to display the degree of any off-balance; a shutter in said test channel; a shutter in said reference channel; a triggering circuit and a stable oscillator arranged to trigger the shutter in said test channel at a fixed recurrence frequency and for fixed duration; a triggering circuit and a variable oscillator arranged to trigger the shutter in said reference channel at a variable recurrence frequency for fixed durations; a gating circuit arranged to allow said two shutters to operate alternately for a fixed interval in each half cycle of said oscillating mirrors, a supplementary detector; and a high speed electronic pulse counter arranged to receive pulses from said supplementary detector; and an optical beam splitter arranged to reflect a small fraction of the light transmitted by the shutter in said reference channel onto said supplementary detector.

9. A double beam spectrophotometer comprising a steady light source; a photosensitive null detector obeying Talbot's law; a system of mirrors and means for oscillating two of said mirrors and means for oscillating two of said mirrors synchronously, so as to make radiation from said light source illuminate a first, test, and a second, reference optical channel alternately at a relatively low frequency and to direct radiation transmitted by either of said channels onto said photosensitive null detector; a phase-sensitive narrow-band amplifier tuned to the frequency of oscillation of said two mirrors and connected to receive the output of said photosensitive null detector; an indicator connected to said amplifier to display the degree of any off-balance; a shutter in the common part of the optical system between the light source and said two channels arranged to modulate the light at a constant, high frequency; a low frequency variable shutter in said reference channel synchronised with said oscillating mirrors; a supplementary detector; a high speed electronic pulse counter arranged to receive pulses from said supplementary detector; and an optical beam splitter arranged to reflect a small fraction of the light transmitted by the said supplementary detector.

10. A double beam spectrophotometer comprising a steady light source; a photosensitive null detector obeying Talbot's law; a system of mirrors and means for oscillating two of said mirrors synchronously, so as to make radiation from said light source illuminate a first, test, and a second, reference, optical channel alternately at a relatively low frequency and to direct radiation transmitted by either of said channels onto said photosensitive null detector; a phase-sensitive narrow-band amplifier tuned to the frequency of oscillation of said two mirrors and connected to receive the output of said photosensitive null detector; an indicator connected to said amplifier to display the degree of any off-balance; a variable sector disc shutter whose open-to-shut time ratio can be varied; a supplementary detector; a high speed electronic counter; a stable high frequency oscillator; an electronic gating circuit arranged to be activated from said supplementary detector and to pass pulses from said oscillator to said counter only when said supplementary detector is illuminated; and an optical beam splitter arranged to reflect a small fraction of the light transmitted by said shutter onto said supplementary detector.

11. In photometric apparatus in which a beam of radiation is to be attenuated to an extent which can be accurately determined, a first means for reducing the average intensity of the radiation without affecting its amplitude, said means comprising a repetitive shutter of which the open time to shut time ratio can be adjusted over a substantial range, and said means being adapted to deliver light pulses of fixed length, wherein the repetition rate of the pulse can be varied, and a second means for counting the light pulses to determine the open time to shut time ratio of the shutter.

References Cited by the Examiner
UNITED STATES PATENTS 1,919,182 7/1933 FitzGerald _____ 250—220 X
2,766,653 10/1956 Martin et al. _____ 88—14

RALPH G. NILSON, *Primary Examiner.*

WALTER STOLWEIN, *Examiner.*

J. D. WALL, *Assistant Examiner.*